US012389382B2

(12) United States Patent
Wallace et al.

(10) Patent No.: US 12,389,382 B2
(45) Date of Patent: Aug. 12, 2025

(54) METHOD FOR DEVICE BAND SELECTION

(71) Applicant: AT&T Intellectual Property I, L.P., Atlanta, GA (US)

(72) Inventors: Todd Wallace, Hamilton, MT (US); Jason Sikes, Carnation, WA (US)

(73) Assignee: AT&T Intellectual Property I, L.P.

( * ) Notice: Subject to any disclaimer, the term of this patent is extended or adjusted under 35 U.S.C. 154(b) by 1035 days.

(21) Appl. No.: 17/402,015

(22) Filed: Aug. 13, 2021

(65) Prior Publication Data

US 2023/0051473 A1 Feb. 16, 2023

(51) Int. Cl.
*H04W 72/0453* (2023.01)
*H04W 8/22* (2009.01)
*H04W 8/24* (2009.01)
*H04W 60/00* (2009.01)
*H04W 72/23* (2023.01)
*H04W 72/51* (2023.01)

(52) U.S. Cl.
CPC ......... *H04W 72/0453* (2013.01); *H04W 8/24* (2013.01); *H04W 60/00* (2013.01); *H04W 72/23* (2023.01)

(58) Field of Classification Search
CPC ..... H04W 72/12; H04W 72/51; H04W 12/08; H04W 8/22; H04W 8/24; H04W 8/245; H04W 72/044; H04W 72/0453; H04W 72/20; H04W 72/21; H04W 72/23; H04W 60/00; H04L 63/10; H04L 41/28
See application file for complete search history.

(56) References Cited

U.S. PATENT DOCUMENTS

| 10,856,131 | B2 * | 12/2020 | Ryu ....................... H04W 76/27 |
| 11,051,363 | B2 * | 6/2021 | Jain ........................ H04W 60/02 |
| 2005/0025302 | A1 * | 2/2005 | Schmid .................... H04M 3/16 |
| | | | 379/93.08 |
| 2006/0210000 | A1 * | 9/2006 | Thomas ................ H04W 16/14 |
| | | | 375/346 |
| 2008/0026766 | A1 * | 1/2008 | Shin ....................... H04W 72/23 |
| | | | 455/450 |
| 2011/0009100 | A1 * | 1/2011 | Oyane ................... H04W 72/56 |
| | | | 455/414.1 |

(Continued)

OTHER PUBLICATIONS

"5G NR frequency bands", Wikipedia, https://en.wikipedia.org/wiki/5G_NR_frequency_bands#Frequency_Range_1, Jul. 23, 2021, 7 pgs.

*Primary Examiner* — Jenee Holland
(74) *Attorney, Agent, or Firm* — Guntin & Gust, PLC; Miyoung Shin

(57) ABSTRACT

Aspects of the subject disclosure may include, for example, receiving at an entitlement server an authentication request from a mobile device operating on a mobility network including a base station, identifying authorized network resources for the mobile device, and communicating to the mobile device a resource authorization message which causes the mobile device to update a device capabilities profile of the mobile device according to the authorized network resources for the mobile device, the resource authorization message further causing the mobile device to communicate an updated device capabilities profile to the base station for subsequent radio communication between the mobile device and the base station. Other embodiments are disclosed.

20 Claims, 9 Drawing Sheets

(56) References Cited

U.S. PATENT DOCUMENTS

| | | | |
|---|---|---|---|
| 2014/0047103 A1* | 2/2014 | Dankberg | H04M 15/8016 |
| | | | 709/224 |
| 2015/0063259 A1* | 3/2015 | Gohari | H04L 5/0092 |
| | | | 370/329 |
| 2015/0312787 A1* | 10/2015 | Das | H04W 36/0033 |
| | | | 370/329 |
| 2016/0044574 A1* | 2/2016 | Naqvi | H04W 8/04 |
| | | | 455/410 |
| 2020/0260363 A1* | 8/2020 | Yang | H04W 8/22 |
| 2021/0204112 A1* | 7/2021 | Kim | H04W 8/24 |
| 2022/0022029 A1* | 1/2022 | Di Girolamo | H04W 4/50 |
| 2023/0292349 A1* | 9/2023 | Lee | H04W 76/15 |
| 2023/0362627 A1* | 11/2023 | Zisimopoulos | H04W 8/245 |

\* cited by examiner

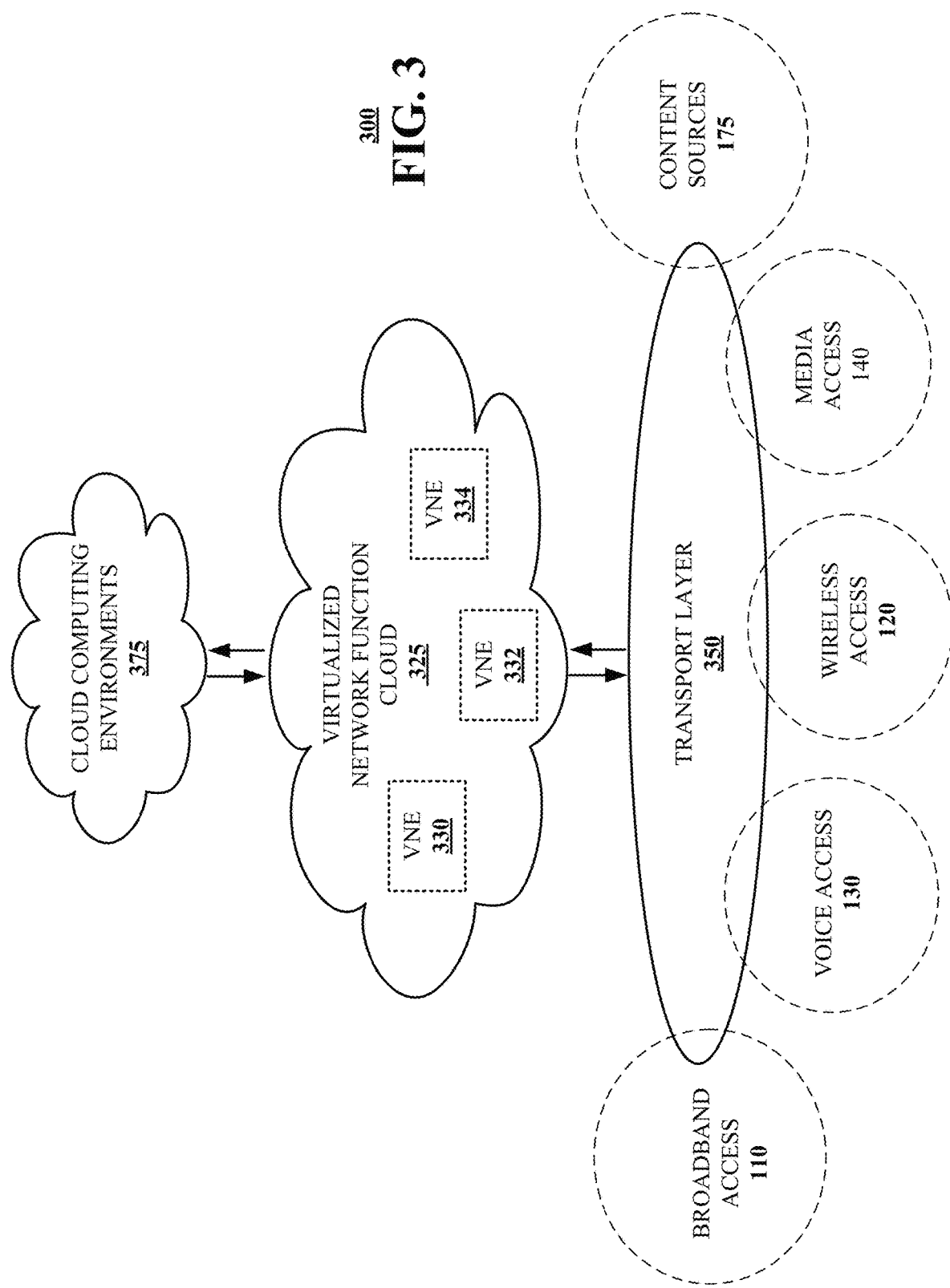

METHOD FOR DEVICE BAND SELECTION

FIELD OF THE DISCLOSURE

The subject disclosure relates to a method and apparatus for selection of network resources such as device frequency bands for radio communication by a device in a mobile communication system.

BACKGROUND

In a mobile communication system, when a mobile device attaches to the cellular network, during the connection process the mobile device sends what is known as the user equipment (UE) capabilities matrix to the network. In this data, the mobile device sends to the network the radio frequency bands that the mobile device supports. The network uses this information to determine which network bands to assign to the device for subsequent communication with the network.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
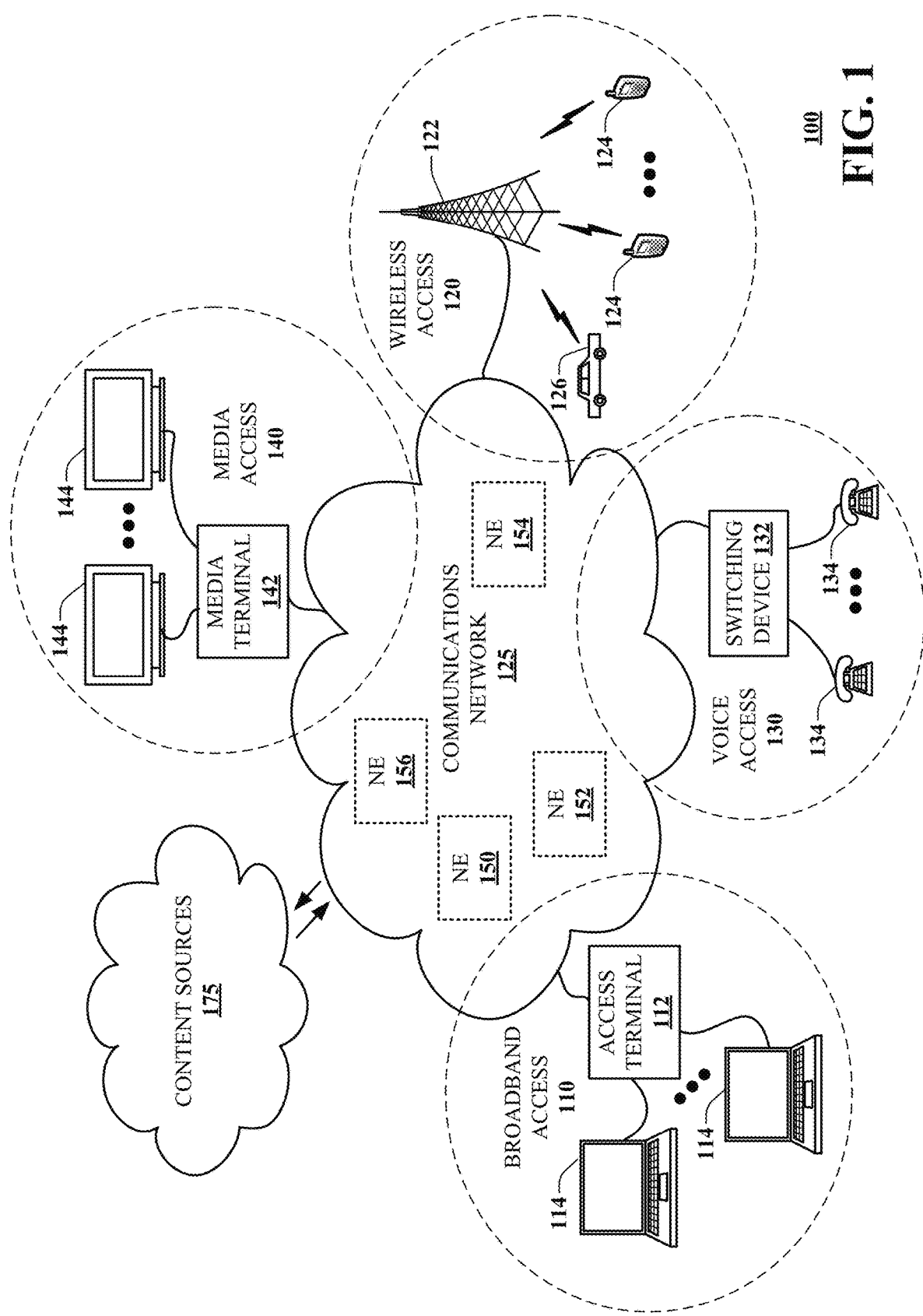
FIG. 1 is a block diagram illustrating an exemplary, non-limiting embodiment of a communications network in accordance with various aspects described herein.

The subject disclosure describes, among other things, illustrative embodiments for using an entitlement server to modify operating parameters of a mobile device in a mobility network. Parameters such as the frequency bands on which the mobile device may operate are modified on a per-user basis by using service provisioning information to identify authorized parameter values, such as authorized frequency bands, and communicating a message to the mobile device to modify the capabilities matrix communicated to a base station of the mobility network when the mobile device registers with the mobility network. In this way, existing functionality of an entitlement server is used to signal directly to the mobile device which operating parameter value the mobile device should use during communication with the base station. For example, use of certain frequency bands that the mobile device is capable of using can be overridden to limit or control services available to the mobile device according to a subscription plan purchased for the mobile device. This enables additional detailed tiering of subscription plans for network users including the user of the mobile device. Other embodiments are described in the subject disclosure.

One or more aspects of the subject disclosure include communicating from a mobile device to a mobility network device capabilities information for the device, receiving, from the mobility network at the device, a resource communication which defines excluded network resources, the resource communication being based on an analysis of network resources available to the device according to a subscription plan for the device. Aspects of the subject invention further include modifying the device capabilities information for the device to omit the excluded network resources from the device capabilities information, forming updated device capabilities information for the device, communicating the updated device capabilities information for the device to the mobility network, and beginning communication between the device and the mobility network according to the updated device capabilities information for the device.

One or more aspects of the subject disclosure include a mobility network including one or more base stations for radio communication with one or more mobile devices, a base station of the one or more base stations operative to receive device capabilities information from a mobile device of the one or more mobile devices and to initiate communication between the mobile device and the base station according to the device capabilities information. Aspects of the subject disclosure further include a service authentication device in data communication with the mobile device to receive the device capabilities information, and operative to authorize use of network resources according to device provisioning information for the mobile device, the service authentication device being operative to communicate to the mobile device an authorization communication which causes the mobile device to modify the device capabilities information to form updated device capabilities information, and communicate the updated device capabilities information to the base station for subsequent communication between the mobile device and the base station according to the updated device capabilities information.

One or more aspects of the subject disclosure include receiving at an entitlement server an authentication request from a mobile device operating on a mobility network including a base station, identifying authorized network resources for the mobile device, and communicating to the mobile device a resource authorization message which causes the mobile device to update a device capabilities profile of the mobile device according to the authorized network resources for the mobile device, the resource authorization message further causing the mobile device to communicate an updated device capabilities profile to the base station for subsequent radio communication between the mobile device and the base station.

Referring now to FIG. 1, a block diagram is shown illustrating an example, non-limiting embodiment of a system 100 in accordance with various aspects described herein. For example, system 100 can facilitate in whole or in part controlling access by a mobile device in a mobility network to particular network resources by communicating commands to the mobile device to update its capabilities information to select or deselect the particular network resources, such as a radio frequency band, and communicating the updated capabilities information to a base station of the mobility network. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
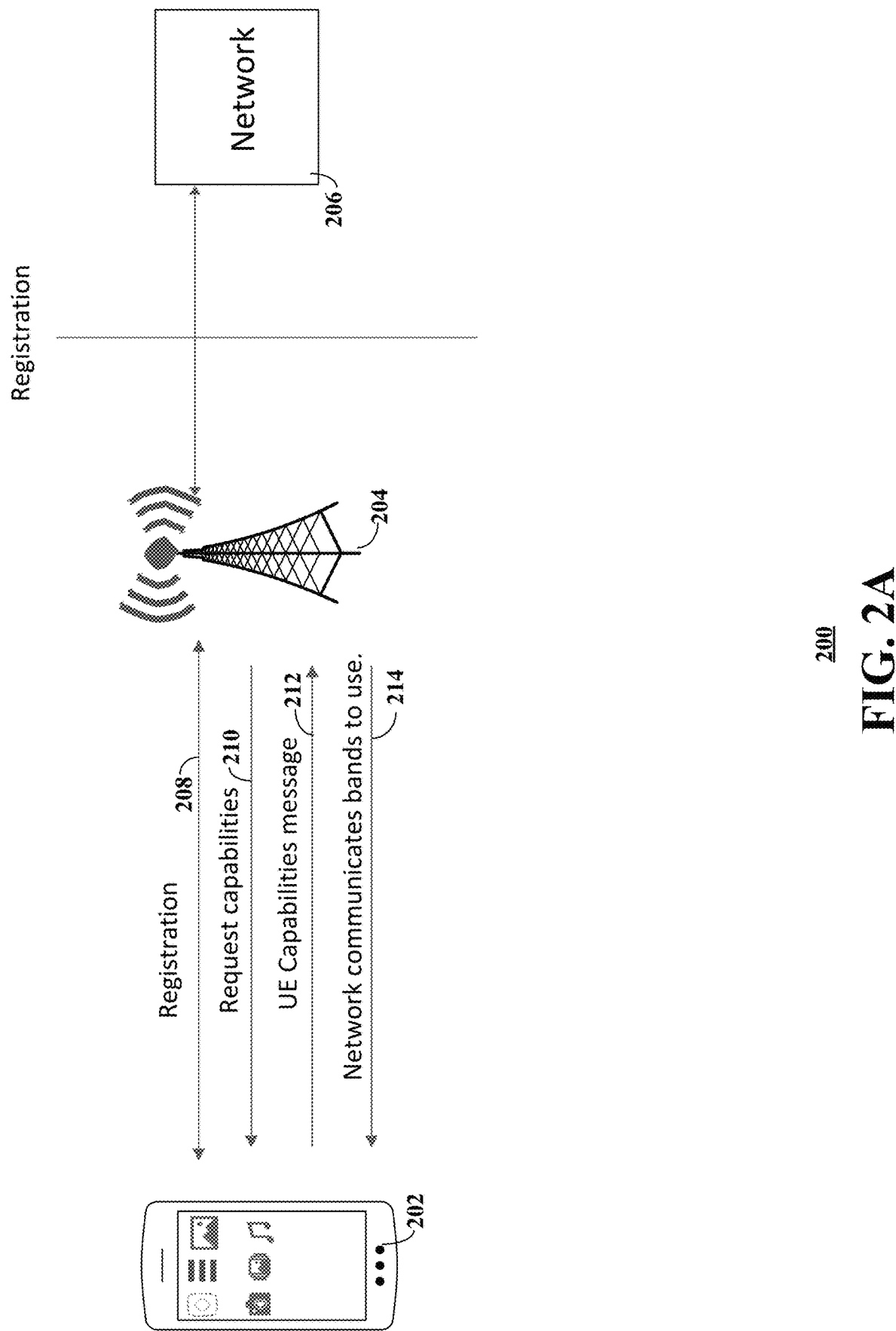
FIG. 2A is a block diagram illustrating an example, non-limiting embodiment of a mobile communication system functioning within the communication network of FIG. 1 in accordance with various aspects described herein.

FIG. 2A is a block diagram illustrating an example, non-limiting embodiment of a mobile communication network 200 functioning within the communication network 125 of FIG. 1 in accordance with various aspects described herein. The exemplary embodiment of the mobile communication network 200 includes a mobile device 202, a base station 204 and a network 206. The base station 204 provides radio communication to mobile devices such as mobile device 202 in a geographic area served by the base station 204. Communication between the base station 204 and the mobile device is standardized according one or more air interface standards such as third generation cellular (3G), fourth generation cellular (4G or long-term evolutions, LTE), fifth generation cellular (5G) and others. The base station 204 may hand off communication with the mobile device 202 to other base stations (not shown) to provide mobility for the mobile device 202. Operations such as control of handover and interconnection with other networks such as the internet are controlled by the network 206. Further, network functions such as subscription to particular services, provision of services and billing are handled by the network 206.

A cellular or other mobility network, such as the wireless access 120 of FIG. 1, and the mobile communication network 200 of FIG. 2A, employs multiple frequency bands of the radio spectrum for radio communication between the base station or access point 122 and mobile devices 124 and vehicle 126 (FIG. 1) and between the base station 204 and the mobile device 202 (FIG. 2A). The frequency bands have different characteristics. For example, some relatively high frequency bands can carry large amounts of traffic but do not propagate well and can reliably be received at a relatively short distance and may not penetrate buildings or other objects. Other, mid-band frequency bands can carry substantial traffic and have good propagation. Other lower-frequency bands have very good propagation, including into houses and other buildings, but they do not have the same capacity for carrying data traffic. Cellular network operators license frequency bands, for example, from government authorities, for use by cell sites of the network operator for radio communication with mobile devices of customers. A network operator may be access to a variety of high-, mid-, and low-frequency bands across the spectrum.

Mobility networks provide radio communication between equipment such as base stations of the mobile network and mobile devices in geographic areas served by the base stations. At the time of registration by the mobile device with the network, and before the mobile device would be able to perform data transfer or make and receive voice calls, the network needs to understand the capabilities of the mobile device so that the network can configure the mobile device accordingly. The network requests for mobile device capabilities, typically during the registration procedure, and stores the information locally. Since the capabilities information is stored, the mobile device doesn't need to send UE capabilities every time radio resource control (RRC) connection is established or re-established. However, the network can request the mobile device to send its capabilities at any time during the RRC connected state.

When a mobile device (referred to as user equipment or UE) attaches to the mobility network, during the registration process, the mobile device sends what is known as the UE capabilities matrix over a radio channel to the network. In this data matrix, the mobile device sends to the network the radio frequency bands that the mobile device supports. The network uses this information to determine which network bands to assign to the device for subsequent communication between the mobile device and the mobility network.

In the example of FIG. 2A, when the mobile device 202 accesses the mobile communication network 200, the mobile device 202 and the base station 204 engage in a registration process 208. In a first step, the base station 204 requests the capabilities of the mobile device 202, step 210. The request may be sent in a standard message format, for example. In a first step, the mobile device 202 or user equipment (UE) returns a UE capabilities message 212. The UE capabilities message 212 may be in a standardized format as well. The UE capabilities message 212 includes information about what frequencies the mobile device 202 is able to use. Such capabilities may depend on the particular mobile device 202, its manufacturer, its model number, etc. Such capabilities may be very hardware dependent, including based on circuitry of the mobile device such as tuner circuits, oscillator circuits, filter circuits and others.

Subsequently, at step 214, the base station 204 decides what frequency bands to assign to the mobile device 202 for use in communicating with the base station 204. The decision is based in part on the frequency bands specified by the mobile device in the UE capabilities message 212 and in part on frequency bands supported by the base station 204. The capabilities of the base station 204 may depend on the particular base station 204, its manufacturer, its model number, etc., and on particular circuitry. The base station 204 cooperates with and communicates with the network 206 in the registration process 208 for the mobile device 202. The base station 204 communicates a frequency band assignment message in step 214 to the mobile device 202 to complete the registration process 208.

When a network operator sells wireless service to a customer, the network operator can control or provision the details of the service the customer has access to, including 4G cellular, 5G cellular, etc. However, the network operator has been unable to allocate spectrum or frequency bands to customers on a per-user basis. Generally, whatever frequency bands are available at a cell site such as the base station or access point 122, are used for mobile devices in the area served by the cell site. If the mobile device such as mobile device 124 communicates that the mobile device 124 can use the available frequency bands, the cell site and network will determine what spectrum or frequency bands to allocate to the user.

Figure 2B:
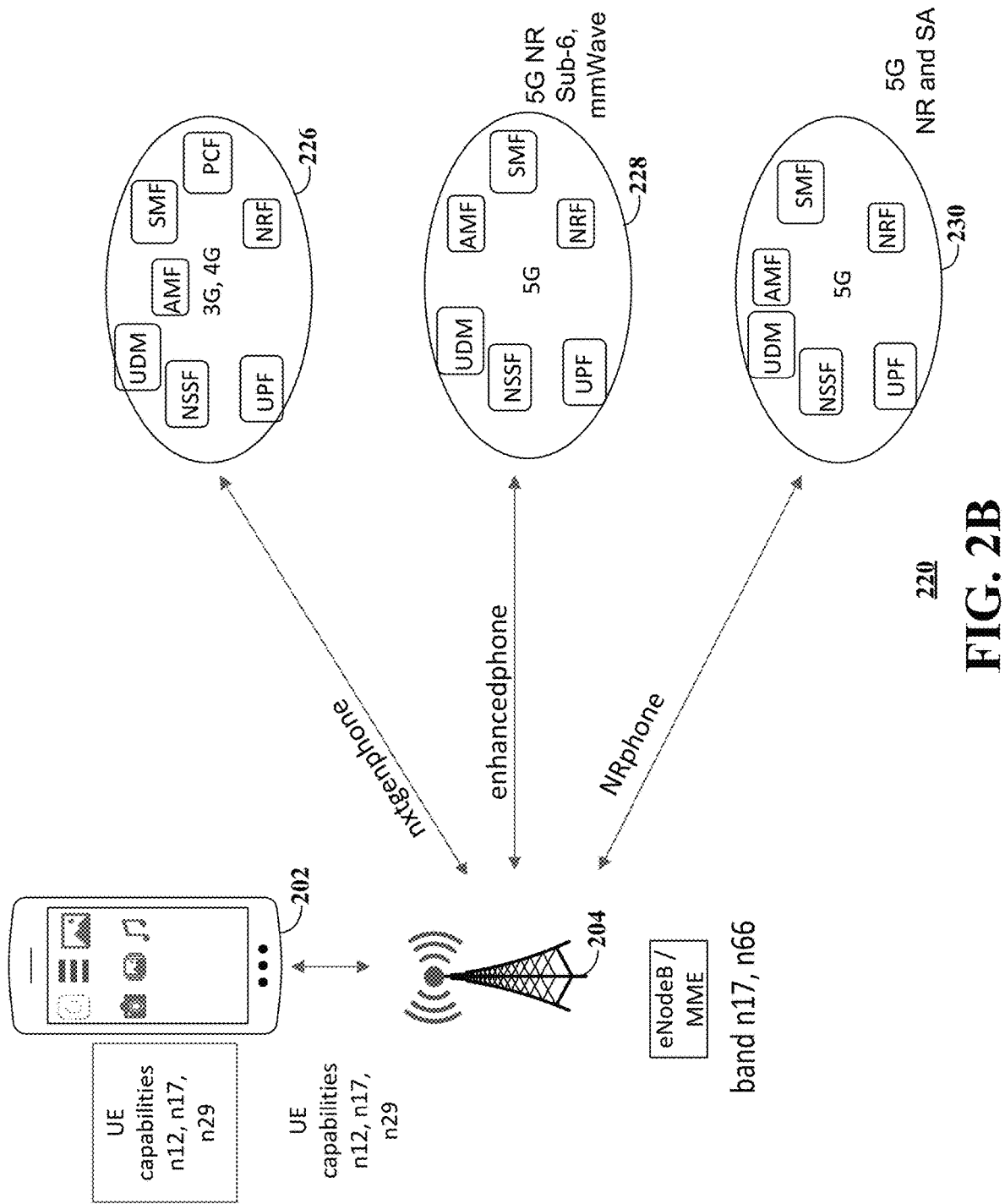
FIG. 2B is a block diagram illustrating an example, non-limiting embodiment of a mobile communication system functioning within the communication network of FIG. 1 in accordance with various aspects described herein.

FIG. 2B is a block diagram illustrating an example, non-limiting embodiment of a mobile communication network 220 functioning within the communication network 125 of FIG. 1 in accordance with various aspects described herein. The exemplary embodiment of the mobile communication network 220 includes a mobile device 202, a base station 204 and a first network 226, a second network 228 and a third network 230. The base station 204 in the illustrated example includes an evolved Node B or eNodeB and a mobility management entity (MIME) for controlling mobility by the mobile device 202 among multiple base stations (not shown).

In the embodiment of FIG. 2B, a network operator operates three independent networks, including first network 226, second network 228 and third network 230 to provide communication services to mobile devices such as mobile device 202. Each respective network includes suitable functions such as an access and mobility management function (AMF), session management function (SMF), unified data management (UDM), network slice selection function (NSSF), user plane function (UPF), policy control function (PCF), and network repository function (NRF).

Each respective network supports different services for mobile devices. In the example, the first network 226 may correspond to the oldest network and provides third generation cellular (3G) and fourth generation cellular (4G or LTE) services to mobile devices. The second network 228 may support mobile devices that are currently in-market and operate on LTE, fifth generation cellular (5G) new radio (NR) and sub-6 GHz and mmWave technology. In 5G systems, sub-6 GHz refers to mid- and low-frequency bands under 6 GHz. Also in 5G systems, mmWave refers to higher frequency radio bands ranging from 24 GHz to 40 GHz. Low-frequency bands are under 1 GHz, while mid-bands range from 3.4 GHz to 6 GHz and are not considered mmWave. mmWave 5G networks are ultra-fast, but they're also ultra-short range. Second network 228 may support 5G non-stand-alone (NSA) technology. The third network 230 may support future or new generation mobile devices, referred to as 5G standalone (SA) technology, as well as LTE and 5G NR devices. Newer networks maintain backward compatibility. The first network 226, the second network 228 and the third network 230 may be referred to as core networks.

The mobile device 202 can access each respective network using a parameter value such as the parameter APN, referring to an access point name. APN is the name or identifier of a gateway between a 3G, 4G or 5G mobile network and another computer network such as the internet. A mobile device such as mobile device 202 making a data connection must be configured with an APN to present to the network operator. In the example if FIG. 2B, the first network 226 is accessed with APN=nxtgenphone; second network 228 is accessed with APN=enhancedphone; and third network 230 is accessed with APN=NRphone. Other examples may be used, and other numbers of networks may be specified in other embodiments.

When the network operator provisions a new device such as mobile device 202 for operation in the mobile communication network 220, the network operator will communicate to the device which APN value to use when accessing services. For example, when provisioning mobile device 202 to use 5G services, the network operator will communicate to the mobile device 202 that the mobile device 202 should use enhancedphone as the APN to access the second network 228.

The value of the parameter APN determines which core network among the first network 226, the second network 228 and the third network 230 should be accessed by the mobile device 202 and ultimately what services the mobile device 202 can use. The eNodeB and MME of the base station 204 control which bands and band combinations the mobile device 202 can use.

In a first example, similar to the registration process 208 of FIG. 2A, the mobile device 202 initially accesses the mobile communications network 220 through a registration process. during the registration process, the mobile device 202 communicates its UE capabilities including information that the mobile device 202 is a 5G device and information about which frequency bands it can use. In the illustrated example, the base station 204 has frequency band n17 and frequency band n66. The UE or mobile device 202 has communicated that it only supports frequency band n12, frequency band n17 and frequency band n29. Therefore, the mobile communication network 220 will not ask the device to use frequency band n66 and will not direct it to that frequency band. Each frequency band is defined, for example, by the 3GPP technical standard TS38.101 in which, for example, frequency band n5 is defined to have an uplink range of 824-849 MHz and a downlink range of 869-894 MHz. Other frequency ranges are similarly standardized and may be licensed and used by network operators.

The mobile device 202 may include an indicator showing the user what service the mobile device is connected to, such as LTE, 5G, etc. The indicator on the mobile device 202 identifying on which service the mobile device 202 is using, such as 5G or 5G+, is determined by which bands the mobile device 202 is attached to and what core network, including the first network 226, the second network 228 and the third network 230, the mobile device 202 is attached to. For example, an illuminated indicator showing the characters 5G on the user interface of the mobile device 202 may indicate a standard 5G cellular service including a first predefined subset of services. An illuminated indicator showing the characters 5G+, or similar distinctive indicator, may indicate a premium 5G cellular service including a second predefined subset of services which may include all of the first predefined subset of services, plus other services. In some embodiments, activating the indicator may be customized to more specifically define what qualifies as premium 5G cellular service. This may support a particular branding or marketing effort by the operator of the mobile communication network 220.

In a second example, the mobile device 202 may communicate a UE capabilities message indicating that the mobile device 202 can support frequency bands n12, n17, n29, n260, and n261 among its UE capabilities. The base station 204, in this example, can support frequency bands n5, n12, n17, n260. The frequency bands n260 and n261 are mmWave bands and can carry vast amounts of data but short propagation. For example, n260 has a specified frequency of 39 GHz and channel bandwidths of 50, 100, 200 and 400 MHz.

The base station 204 broadcasts the frequency bands it has available, in this example frequency bands n5, n12, n17, n260. The mobile device 202 communicates to the base station 204 what frequency bands the mobile device can detect, as well as relative signal strength of each detected frequency band. Thus, in this second example, the mobile device 202 communicates a UE capabilities message to the base station 204 that it can detect frequency bands n12, n17, and n260 which is the logical intersection of the set of frequency bands useable by the mobile device 202 and the frequency bands useable by the base station 204. The network or base station 204 uses the information about frequency bands and signal strength to decide what frequency band to tell the mobile device to connect to. Even though the base station 204 can use frequency band n5, the base station 204 will never tell the mobile device 202 to connect to frequency band n5 because the base station 204 knows the mobile device 202 is not capable of using frequency band n5.

Conventionally the network or base station 204 is unable to assign bands on a per user basis. The base station 204 including the eNodeB and the MME do not have the capability to do a look up and assign frequency bands based upon user identity information or mobile device identification information. The base station 204 has no information about subscription information paid for by the user for the mobile device 202 and so cannot use that information in assigning a frequency band to the mobile device 202. The network attempts to use available communication bandwidth as efficiently as possible. So long as the UE or mobile device 202 states that it can support one or more frequency bands, the network or base station 204 will intelligently allocate the spectrum to the UE or mobile device 202.

The network operator would like to have some customers that can obtain 5G cellular service on both mmWave frequency bands and sub-6 frequency bands. The network operator would like to have customers that can obtain 5G cellular service on only sub-6 frequency bands. The network operator would like to have customers that can obtain 5G cellular service on both mmWave frequency bands and sub-6 frequency bands, and also obtain 5G cellular service on SA frequency bands. This allows the network operator to offer a variety of services and products at different price points to satisfy different customers. This also allows the network operator to distribute subscribers among different frequency bands and different technologies to maximize usage of network resources.

Figure 2C:
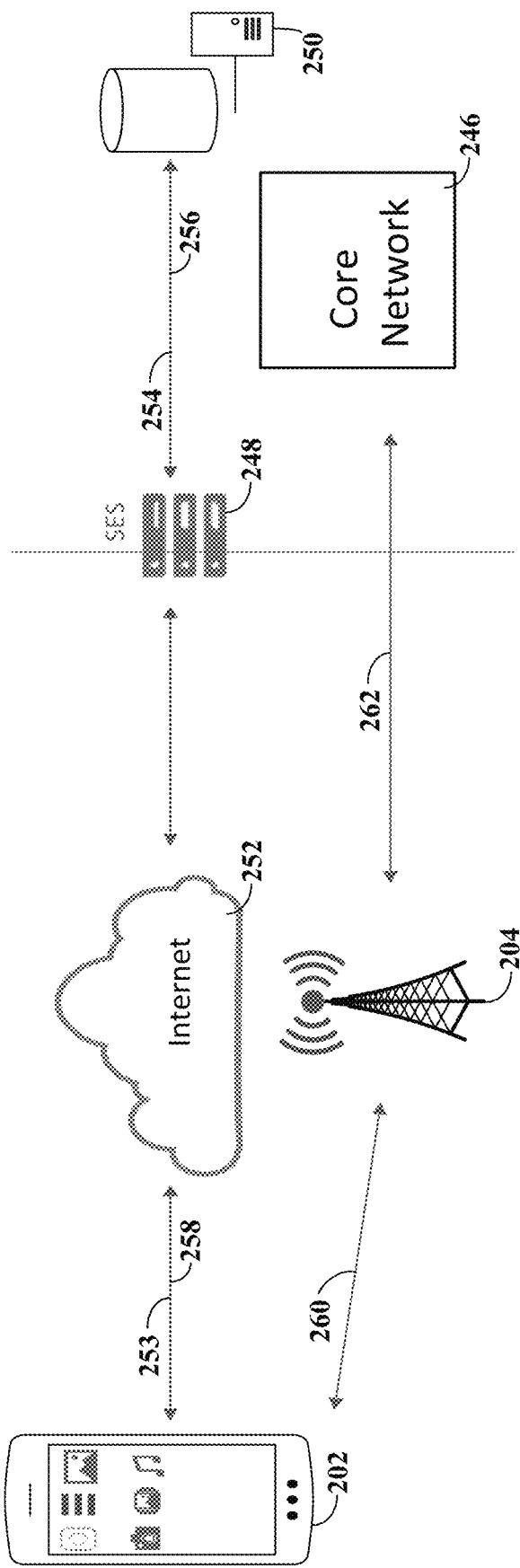
FIG. 2C is a block diagram illustrating an example, non-limiting embodiment of a mobile communication system functioning within the communication network of FIG. 1 in accordance with various aspects described herein.

FIG. 2C is a block diagram illustrating an example, non-limiting embodiment of a mobile communication network 240 functioning within the communication network 125 of FIG. 1 in accordance with various aspects described herein. The exemplary embodiment of the mobile communication network 240 includes a mobile device 202, a base station 204, a core network 246, a secure entitlement server (SES) 248 and a database 250. The database 250 is a business support system (BSS) that stores information about services and network features which the mobile device 202 is authorized to use. The SES 248 may access the database 250 to obtain such information about a particular mobile device such as mobile device 202. The mobile communication network 240 is operated by a network operator.

The mobile device 202 can be implemented as a smart phone or other handheld communication device. The mobile device 202 can access the core network 246 through a radio connection with the base station 204. The mobile device 202 can access the SES 248 over any suitable connection including the internet 252. In some embodiments, the mobile device 202 can access the internet 252 through the base station 204, through a Wi-Fi connection using a Wi-Fi radio according to a radio standard such as IEEE 802.11x and a Wi-Fi access point (not shown) in communication with the internet 252.

The core network 246 may include a plurality of core networks such as first network 226, second network 228, and third network 230 shown in FIG. 2B. The services provided by each network including the radio access technology supported by each network, may be partitioned or distributed among the plurality of core networks in any suitable manner.

The SES 248 forms a service authentication device. The SES 248 provides a means for UE devices such as the mobile device 202 to get information in a secure way on an individual user basis. UE devices such as the mobile device 202 communicate with the SES 248 to determine if the UE devices are allowed to use services such as Wi-fi calling, Hotspot® network service, FaceTime® communication service, and other services. The SES 248 is an out of band or out of network device in that it is not part of the inherent functioning of the mobile communications network 240. The functioning of the mobile communication network 240 occurs independently of the SES 248 but some aspects of the functioning of the mobile communication network 240 may be controlled by the SES 248.

Some mobility network operators have implemented a network element called the secure entitlement server such as SES 248 or other devices to provide similar functionality is the mobility network. The SES 248 handles authentication of devices, services, subscriptions and subscription profiles of users. Further, the SES 248 enables over the air (OTA) configuration of setting of mobile devices such as the mobile device 202. For example, the SES 248 can be used for establishing a subscription to use Wi-Fi calling and Voice Over LTE (VoLTE) calling for the mobile device. Once the service is provisioned on the SES 248, information about the subscription is provided to the mobile device 202 and the mobile device 202 updates its setting to reflect the subscription and enable the service at the mobile device 202.

The SES 248 or other service authentication device may be embodied in any suitable manner. In the example of FIG. 2C, the SES 248 is embodied as a server computer in data communication with a network including the internet. In other embodiments, the SES 248 or other service authentication device may be embodied as hardware or software or any combination of these and located at any suitable location in data communication with UE devices such as the mobile device 202.

The mobile device 202 from time to time authenticates with the SES 248 and inquires about entitled services such as We-Fi calling, operation as a hotspot or tethering. The mobile device 202 will not enable any of the entitled services until receiving an indication from the SES 248. In accordance with various aspects described herein, dynamic provisioning of spectrum may be accomplished making use of the functionality of the SES 248.

In some applications, the network operator may wish to assign spectrum or frequency bands to a particular user or a particular mobile device for a wide range of reasons, including technical reasons and business reasons. In one example, a user has an account with the network operator that specifies the service features the user is entitled to use, including both capabilities and limitations. In current devices, the cell site has no information about a customer's subscribed service features and what frequency bands the customer may be entitled to use. The cell site or base station 204 only has information about ability of a user and the user's mobile device to connect to the cell site and use the mobile communication network 240. Thus, the network provider currently has no ability to provision spectrum on a per-user or per-device basis but would like the flexibility to do so. In accordance with various aspects described herein, a method and apparatus are described to assign bands on an individual user basis, as long as the device supports the band.

Users and user equipment devices are provisioned in a mobility network such as mobile communications network 200, mobile communication network 220, and mobile communications network 240 for certain large categories of network technologies. For example a user may be provisioned for fifth generation cellular non-standalone (5G NSA) technology, or fourth generation, long-term evolution (LTE) technology. The provisioned technology defines what radio access network (RAN) is used by a mobile device to access the mobility network. However, at the RAN, the network does not support provisioning users for specific network frequency bands. If a particular network technology supports a specific group of frequency bands, and if the UE device or mobile device 202 supports the frequencies, then the UE device will have access to them all.

This may be illustrated with an example. A mobility network operator holds licenses for the following fifth-generation cellular, frequency range 1 new radio (5G FR1 NR) frequency bands: n5, n66, n30 and n77. For this example, assume that all these bands are deployed at a single cell site such as base station 204 in mobile communications network 240. When the user and the mobile device 202 is provisioned for fifth-generation, new radio (5G NR) technology, the user will have access to all these bands. When the mobile device 202 attempts to connect to the cell site, base station 204, it will send the UE capabilities of the UE device in a UE capabilities message 212 over a radio channel to the base station 204 and the network 206 (FIG. 2A). The UE capabilities in typical embodiments are contained in a matrix or data file having a predetermined format in the UE capabilities message 212. In this file, the mobile device 202 will specify that the UE device supports 5G NR technology and that the mobile device 202 supports a wide range of bands. In the file, the mobile device 202 could specify that the mobile device 202 supports frequency bands n5, n40, n2, n41, n66, n30, and n77.

Because the mobile device 202 specifies that it can support all of the bands that the cell site has, the network 206 will record that it can use them all. The network 206 will then allocate spectrum to the UE device based upon normal operating parameters. However, as long as the mobile device 202 states that it can support the band, the network 206 will allocate the spectrum that is available at the site, base station 204. It may occur that frequency bands n5, n66, n30 and n77 are available at the site and are supported by the UE device, mobile device 202. However, for business reasons or other network management reasons, the mobility network operator prefers to provide access to this spectrum for some customers but not to provide access to this spectrum for other customers. In an example, the mobility network operator may want a first customer to be able to access frequency band n77, but a second customer should not be able access frequency band n77. In conventional mobility networks, if the user is provisioned to use a specific network service like 5G NR, it is not possible to dynamically provision spectrum to an individual user or group of users.

In an exemplary embodiment, in a first step 253, a UE device such as the mobile device 202 connects to the SES 248 and authenticates using, for example, extensible authentication protocol and key agreement (EAP/AKA) for authentication and session key distribution. The mobile device 202 inquires what frequency bands it should use or if there are frequency bands it should disable. In a second step 254, the SES makes a call to the database 250 to determine what bands are available. The database 250 responds back, step 256, with information about what frequency bands are allowed and what frequency bands are not allowed for use by the mobile device 202. Then the SES 248 communicates, step 258 with the mobile device and authorizes the device to use specified frequency bands or to inhibit use of other specified frequency bands. Once authorized, the UE or mobile device 202 can use the frequency bands. The mobile communication network 240 communicates a frequency band authorization communication with the mobile device 202 about which bands that the network prefers to assign or not assign to the mobile device 202. In one embodiment, the mobile communication network communicates a frequency band authorization communication including an authorized list of the frequency bands the mobile device is authorized to use for communication with the base station 204. The frequency band authorization communication may be made over the air from the base station 204 to the mobile device using the mobility network. In other embodiments, the frequency band authorization communication may be made over any other suitable network, including the public internet, in data communication with the mobile device 202.

In response to the frequency band authorization communication, the mobile device 202 adjusts its capabilities matrix. The capabilities matrix stores and communicates information about the technical capabilities of the mobile device 202. The stored and communicated information includes a list of capable frequency bands the mobile device 202 can use for communication with the mobile communication network 240 including the base station. Initially, this list of capable frequency bands the mobile device 202 can use for communication with the base station 204 includes all frequency bands available based on the circuitry of the mobile device 202, such as oscillator circuits, tuner circuits and filter circuits. The initial capabilities matrix includes the list of capable frequency bands defined by the hardware and/or software of the mobile device 202. After receiving the frequency band authorization communication with the authorized list of the frequency bands the mobile device is authorized to use for communication with the base station 204, the mobile device 202 deletes from the list of capable frequency bands the mobile device 202 can use for communication with the base station 204 any frequencies not on the authorized list of frequency bands to update the capabilities matrix and form an updated capabilities matrix. The mobile device 202 stores an updated list of capable frequency bands. The mobile device 202 the communicates the updated capabilities matrix, including the updated list of capable frequency bands, step 260. The updated list of capable frequency bands is communicated to the network step 262. The network records which frequency bands that the mobile device 202 says that it can use and will only direct the mobile device 202 to bands that the mobile device is capable of using.

In an example, the following frequency bands are available for 5G NR technology at a base station: n5, n66, n30 and n77. For any reason, including business reasons, the mobility network operator does not want the user or the mobile device 202 to be able to use frequency band n77. When the UE device communicates with the SES 248, the SES 248 authenticates the mobile device 202 and determines which user is associated with the mobile device 202. The SES 248 then performs a look-up operation to see if this user has any restrictions. This may be done as a database look-up in a database such as the database 250, storing user account information. The SES 248 in this example determines that this user should not use frequency band n77. The SES 248 communicates to the UE device, mobile device 202, that it is authorized for all frequency bands, except frequency band n77. The mobile device 202 then adjusts its UE capabilities matrix and removes from the UE capabilities matrix data indicating that the mobile device 202 can use frequency band n77. The mobile device 202 then sends an updated UE capabilities matrix to the network over the radio channel. The core network 246 now sees that the mobile device 202 cannot use frequency band n77 and the core network 246 stores this information. For the rest of the session, the core network 246 will never allocate frequency band n77 to the mobile device 202 through normal operation, because the mobile device 202 has announced in the updated UE capabilities matrix that the mobile device 202 does not support frequency band n77.

In a second example, for any reason including a business reason, the mobility network operator wants to sell 5G NR UE devices at different prices, including a first price for operation on only frequency range FR1 and another price for operation on both frequency range FR1 and frequency range FR2. Frequency range FR2, also known as mmWave spectrum, includes frequency band n260 and frequency band n261, for example. For a first customer who is paying for just frequency range FR1, when the mobile device 202 authenticates to the SES 248, the SES 248 responds back that the first customer cannot use frequency band n260 and frequency band n261. The mobile device 202 will then adjust its UE capabilities matrix and report to the core network 246 that it cannot use frequency band n260 and frequency band n261. With this, the network will never try to attach the device to mmWave frequency range, frequency range FR2. In this manner, the frequency ranges available to the user may be tailored by the network operator. Any other capabilities reported in the capabilities matrix may be adjusted in this manner to authorize or de-authorize network services or network features available to the mobile device 202.

Figure 2D:
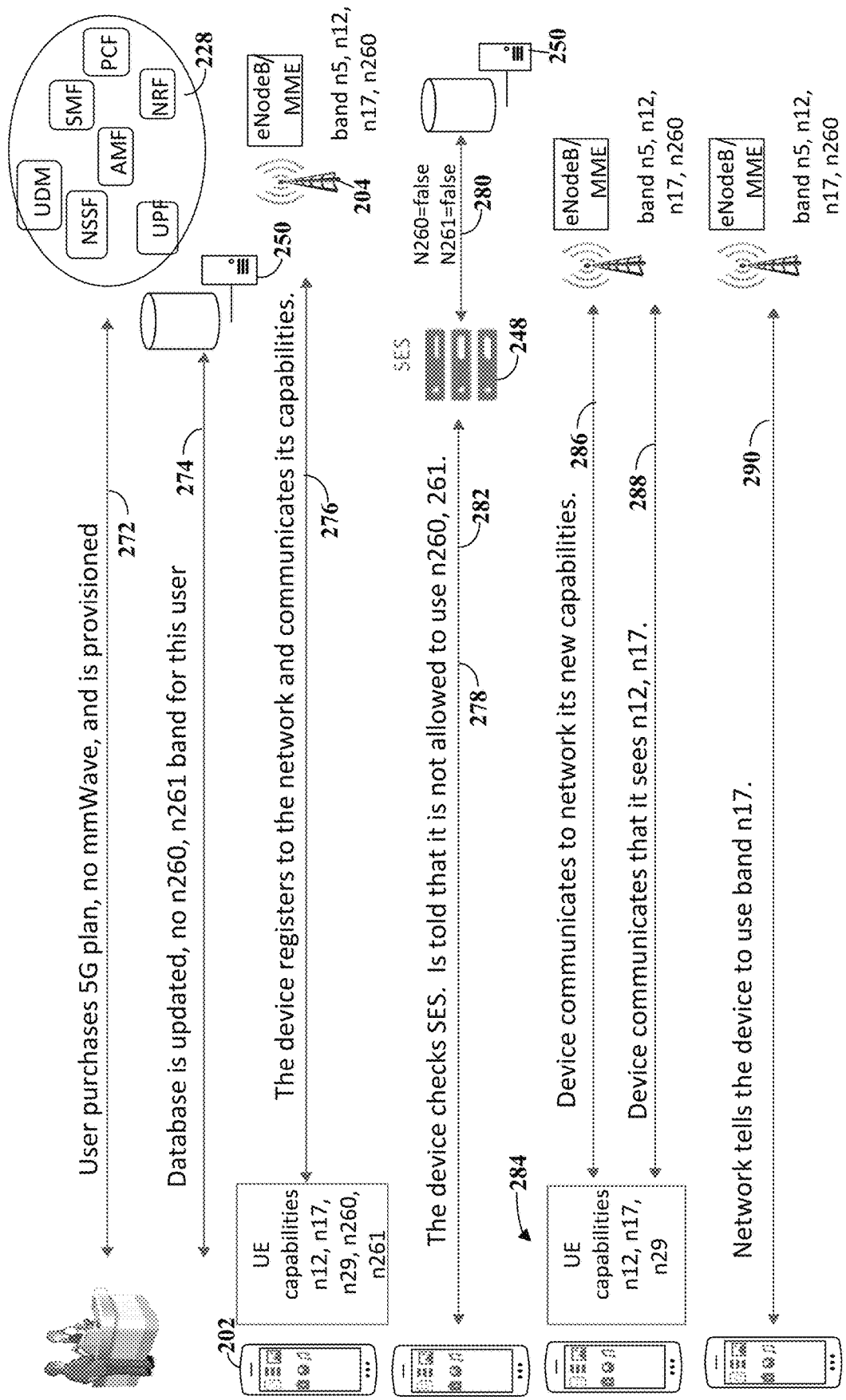
FIG. 2D depicts an illustrative embodiment of a method in accordance with various aspects described herein.

FIG. 2D depicts an illustrative embodiment of a method 270 in accordance with various aspects described herein. The method 270 illustrates an example embodiment in which a user acquires a new cellular phone or other mobile device. The user interacts with a retail sales representative of a mobility network operator at a retail sales location. As part of the transaction, the retail sales representative assists the user in selecting a subscription plan including a number of features. The subscription plan may be one of several subscription plans which are prepackaged to include preselected features. For example, there may be a high tier subscription plan with relatively many features, a mid-tier subscription plan with an average number of features and a low-tier subscription with relatively few features. The respective subscription plans may include or omit features such as Wi-Fi calling, video calling, voice over LTE (VoLTE), video over LTE (ViLTE), use of the device as a hotspot to provide Wi-Fi access to a network for other nearby devices, and other features as well. In another example, the retail sales representative may assist the user to select features ala carte from a detailed menu of features.

At step 272, the user purchases a subscription plan for mobile communication services. The subscription plan specifies features to which the user has access including a radio access technology. In the example, the purchased subscription plan is a 5G cellular plan with access to technologies including 5G NR, 5G Sub-6 and 5G mmWave. In the example mobile communication network 220 of FIG. 2B, the subscription plan includes access to second network 228. However, in the example of FIG. 2D, the subscription plan includes 5G access but no access to mmWave frequency bands. The user's subscription plan is provisioned in second network 228. Provisioning the user's subscription plan may involve receiving information defining a service level tier for a user account associated with the mobile device.

At step 274, the database 250 is updated to reflect the subscription plan purchased by the user at step 272. In particular, the database 250 is stored with the information that the user's subscription plan does not include use of frequency bands n260 or n261. Information about other aspects of the user's subscription plan may be stored in the database 250 as well for subsequent access.

At step 276, the user powers on the mobile device 202 in the vicinity of a base station 204 of the mobile communications network. In accordance with conventional operation, the mobile device 202 begins radio communication with the base station 204 over a suitable radio channel. The base station 204 requests UE capabilities information from the mobile device 202. The mobile device 202 communicates its UE capabilities matrix. In the example, the mobile device 202 includes circuitry to access several frequency bands, which may be referred to as capable frequency bands, including frequency bands n12, n17, n29, n260, and n261. Frequency bands n12, n17, n29 are in frequency range FR1 and are part of the subscription plan of the user. Frequency bands n260 and n261 are in frequency range FR2 and are not part of the subscription plan of the user. Initially, the initial capabilities matrix includes the list of capable frequency bands. The UE capabilities matrix is communicated to base station 204 which, as indicated in FIG. 2D, has base station capabilities of radio communication on frequency bands n5, n12, n17 and n260.

From time to time, the mobile device 202 authenticates with the SES 248. This may be done at any suitable time, including during registration with the network, prior to initiating a data session or a voice call, or on any other schedule. The mobile device 202 communicates a message to the SES 248. At step 280, the SES 248 performs a look up to database 250, or other network elements as needed to determine if the user is authorized to use a service or other network feature. At step 280, the database 250 returns information about what frequency bands the mobile device 202 is authorized to use. The returned information may be in any suitable format, including for example an authorized list of the frequency bands the mobile device is authorized to use for communication with the base station 204, including authorized frequency bands such as n12 and n17 in this example. The returned information may be a list of forbidden frequency bands that the SES 248 must block for the user and the mobile device, or frequency bands n260, n261 in this example.

At step 282, the SES 248 responds back to the mobile device 202 what services that the user is allowed to use as well as what frequency bands the mobile device 202 is allowed to use. The information about services and frequency bands is according to the subscription plan of the user selected at step 272. The communication received by the mobile device 202 at step 282 may be termed the frequency band authorization communication with the authorized list of the frequency bands the mobile device is authorized to use for communication with the base station 204.

At step 284, the mobile device 202 updates its capabilities matrix based on the information received at step 282 about the available frequency bands. The mobile device 202 for example deletes from the list of capable frequency bands the mobile device 202 can use for communication with the base station 204 any frequencies not on the authorized list of frequency bands to update the capabilities matrix, including n260 and n261 in this example, forming an updated capabilities matrix. The updated UE capabilities matrix in this example includes frequency bands n12, n17, n29, which are authorized by the user's subscription plan. The updated UE capabilities matrix omits frequency bands n260 and n261 which are not authorized by the user's subscription plan.

At step 286, the mobile device 202 communicates the updated UE capabilities matrix to the network. Specifically, the mobile device communicates the updated UE capabilities matrix to the base station 204. The network, including the eNodeB and MME of the base station 204, records which frequency bands mobile device reported in the updated UE capabilities matrix. Subsequently, the network will only direct that UE to frequency bands that the UE is capable of using, the frequency bands of the updated UE capabilities matrix.

At step 288, the mobile device 202 reports what frequency bands it can detect from the base station 204. For example, the base station 204 may broadcast a beacon signal on all frequency bands the base station 204 can use, in this example frequency bands n5, n12, n17, n260. After detecting the beacon signal, the mobile device 202 formats one or more messages and communicates to the base station information about detected frequency bands transmitted by the base station 204 and received by the mobile device 202.

At step 290, after receiving from the mobile device 202 the information about detected frequency bands at the mobile device 202, the base station 204 selects a frequency band for the mobile device 202 to use. The selection is based on the frequency bands reported in the updated UE capabilities matrix received at step 286. The updated UE capabilities matrix omits frequency bands n260 and n261 in the mmWave frequency range FR2 because the user's subscription plan does not include access to those frequency bands.

The base station 204 communicates to the mobile device 202 information defining the selected frequency band, in this example, frequency band n17. When a data session begins, frequency band n17 will be used between the mobile device 202 and the base station 204. Similarly, the mobile device 202 will monitor a paging channel of frequency band n17 from the base station 204. In the event of interference or handover to another base station, the base station 204 may direct the mobile device 202 to use another frequency band other than frequency band n17 for communication. However, the base station 204 and no other base station in the network will direct the mobile device 202 to use non-provisioned frequency bands n260 and n261.

Subsequently, the user's subscription plan may change or be updated to permit usage of mmWave frequency bands by the mobile device 202. In that case, the user's account is provisioned to include mmWave capability. The authorized list of the frequency bands is updated to include mmWave frequency bands n260, n261 according to the updated provisioning. The network then may send a message to the mobile device 202 instructing the mobile device 202 to authenticate with the SES 248 to verify authorized services and frequency bands. At that time, the mobile device 202 will further update its UE capabilities matrix to include the newly authorized frequency bands n260 and n261. The mobile device 202 communicates its further updated UE capabilities matrix to the network and the network adds frequency bands n260 and n261 to the list of authorized frequency bands for the mobile device.

This provides a network-level mechanism to change the capabilities of a user and the mobile device. This can be done very rapidly at an on-demand basis for each user. For example, if the user is attending an event with virtual reality features that are best experienced on a mmWave channel, the user may use the mobile device 202 to access his account with the network provider, pay to modify the user's subscription plan for a particular time period or time duration or location, and receive access to the mmWave frequencies and data rates. The SES 248 receives information about the modification to the user's subscription plan and communicates to the mobile device an updated resource authorization message. The updated resource authorization message instructs the mobile device to modify the UE capabilities matrix of the mobile device. In this example, the mobile device adds mmWave frequency bands to the list of authorized frequency bands. Further, the updated resource authorization message causes the mobile device to transmit the modified UE capabilities matrix to the base station and the base station will enable communication on the mmWave frequency bands. The subscription modification may be done for a set period of time, such as 24 hours, or for a predetermined location, such as the current location of the mobile device.

Thus, the SES 248 capabilities are able to cooperate with the ability of the mobile device 202 to communicate its UE capabilities to the network. The network including the SES 248 tells the mobile device 202 what it is capable of using so that the mobile device changes its UE capabilities message to the network. The network, including the base station 204, responds to the capabilities message for controlling access to the network by the mobile device 202.

In some examples discussed herein, the frequency bands under consideration are frequency bands licensed by and controlled by the mobility network operator. The network operator may use aspects described herein to control and limit access to its frequency bands by its subscribers. These aspects may be extended to other aspects of network operation as well. For example, some mobile devices active on a first network are not subscribers but are roaming to that network. Roaming mobile devices are associated with a subscription on a second mobility network. The operators of the first network and the second network have roaming agreements that allow subscribers to one network to freely access the other network.

However, in some instances, one network operator may choose to limit roaming access to certain licensed frequency bands, including high data capacity frequency bands. For example, when a roaming device accesses a network, an access database such as the database 250 may return an indication that the device is roaming and therefore not entitled to use specified frequency bands. The device will be instructed to update its UE capabilities matrix to omit the specified frequency bands and provide the updated UE capabilities matrix to the serving base station. The roaming device will then be excluded from access to the specified frequency bands.

Additional levels of screening or filtering of devices may be applied. For example, a geographic limitation may be imposed so that roaming devices in a particular state or region are excluded from access to certain network resources such as frequency bands. Similarly, a temporal limitation may be imposed on top of the roaming limitation so that roaming devices are excluded from certain network resources at certain times of day. For example, roaming devices may be excluded from certain frequency bands during rush hours of 6:00 to 9:00 AM and 4:00 to 7:00 PM, or to be in effect for a specified time duration such as 24 hours. The effect would be to limit use of such network resources to subscribers at those times of day or in those localities.

In other examples, screening or filtering of device use of network resources may include a prediction of available network resources, prediction of network loading or traffic volume, or predicted network events such as network maintenance. In other examples, screening or filtering of device use of network resources may include one-time events such as presentation of a championship game or even regularly scheduled events such as a weekly football game. If the network operator is aware of some circumstance, such as heavy traffic or maintenance or an event, the network operator may choose to enable certain network features on a user-by-user basis for a specified time or location in the network.

Any network resource that is reported in the UE capabilities matrix may be limited in this manner. Such resources may include radio frequency parameters such as frequency bands or band combinations, physical layer parameters for the downlink and, separately, for the uplink, and features such as supported speech coders that may provide different levels of speech quality. The SES 248 or other network component determines entitlement of the mobile device to use a particular network resource. Based on that entitlement determination, the SES 248 communicates through a base station or other network path to the mobile device 202 to modify and update its UE capabilities information. The mobile device then provides the updated UE capabilities information to the network where it is noted for use during future communication and stored locally at the base station.

The features and aspects described herein provide substantial advantages to network operators and subscribers in a mobility network. The network operator can provide selective access to various network features that are part of the UE capabilities. This enables the network operator to develop different products, with different features, for different customers. For example, and enterprise customer such as a business buying cell phone service for a number of employees, may be provided with access to certain network features that are not accessible to individual subscribers not part of the enterprise. An example is a walkie-talkie features that allows team members of the enterprise to freely collaborate but excludes non-team-members as well as the general public.

Subscribers enjoy a benefit of a rate plan and subscription with features that may be tailored to the subscriber's particular needs. A send-and-end user who primarily uses a mobile device for voice communication may select a less-rich rate plan and pay a smaller subscription fee. A user who is a gamer and needs substantial bandwidth and high data rates over the network may choose a rate plan that enables band stacking and the highest data rates, at a suitable subscription fee. Subscription plans for all users may be better tailored to each user's needs.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of mobile communication network 200, mobile communication network 220, mobile communication network 240 and method 270 presented in FIGS. 1, 2A, 2B, 2C, and 2D. For example, virtualized communication network 300 can facilitate in whole or in part controlling access by a mobile device in a mobility network to particular network resources by communicating commands to the mobile device to update its capabilities information to select or deselect the particular network resources, such as a radio frequency band, and communicating the updated capabilities information to a base station of the mobility network.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
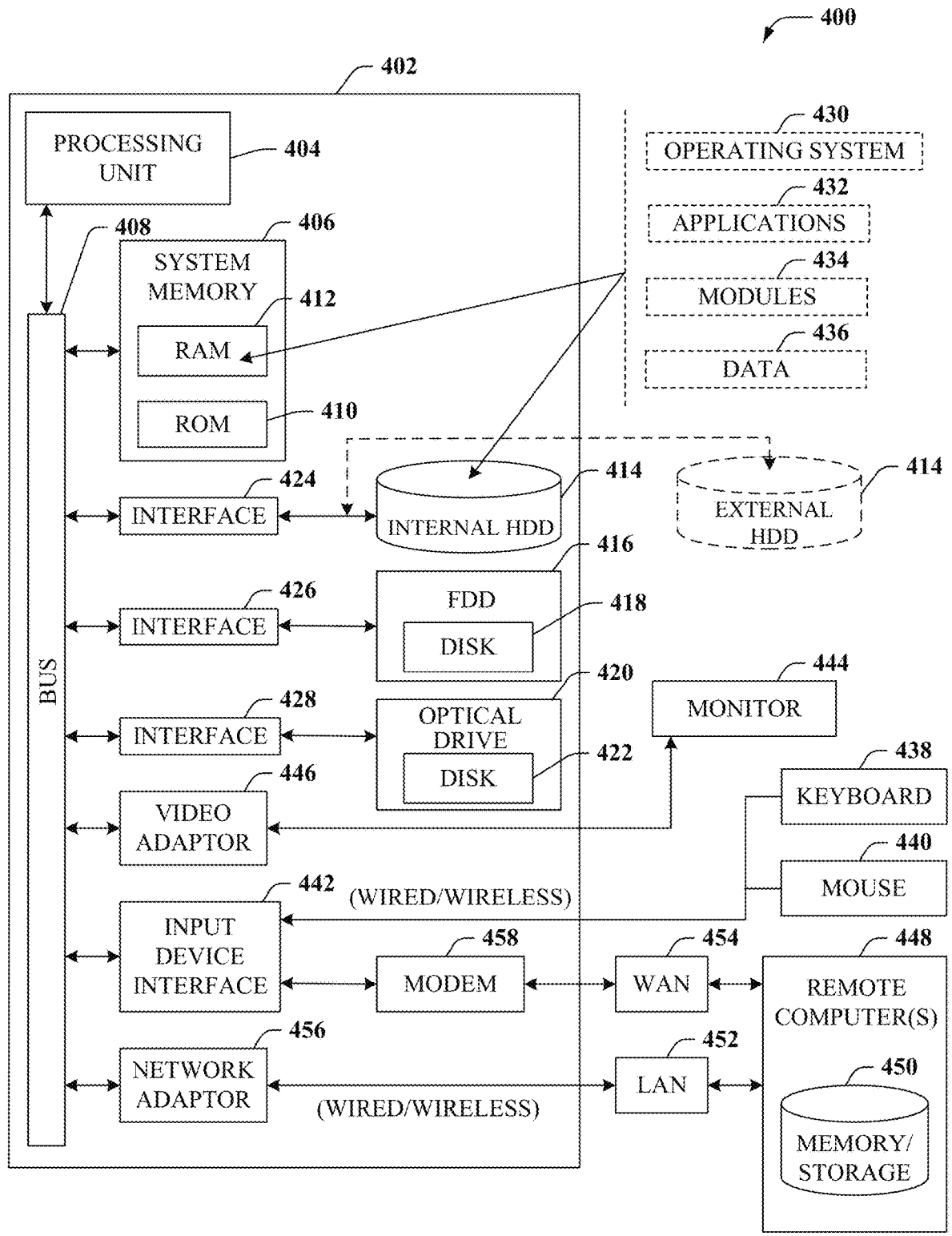
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part controlling access by a mobile device in a mobility network to particular network resources by communicating commands to the mobile device to update its capabilities information to select or deselect the particular network resources, such as a radio frequency band, and communicating the updated capabilities information to a base station of the mobility network.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM),flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
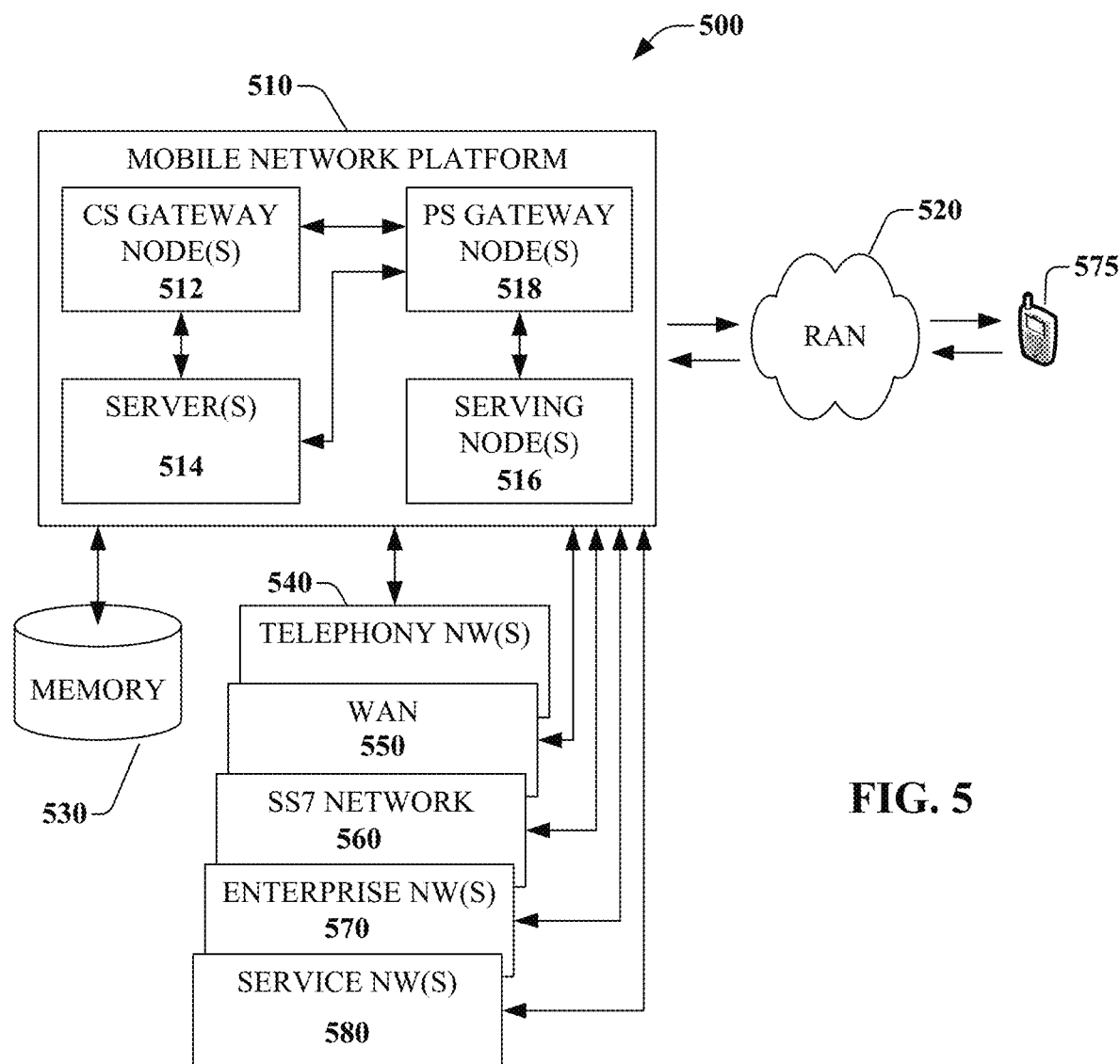
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part controlling access by a mobile device in a mobility network to particular network resources by communicating commands to the mobile device to update its capabilities information to select or deselect the particular network resources, such as a radio frequency band, and communicating the updated capabilities information to a base station of the mobility network. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s)

518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
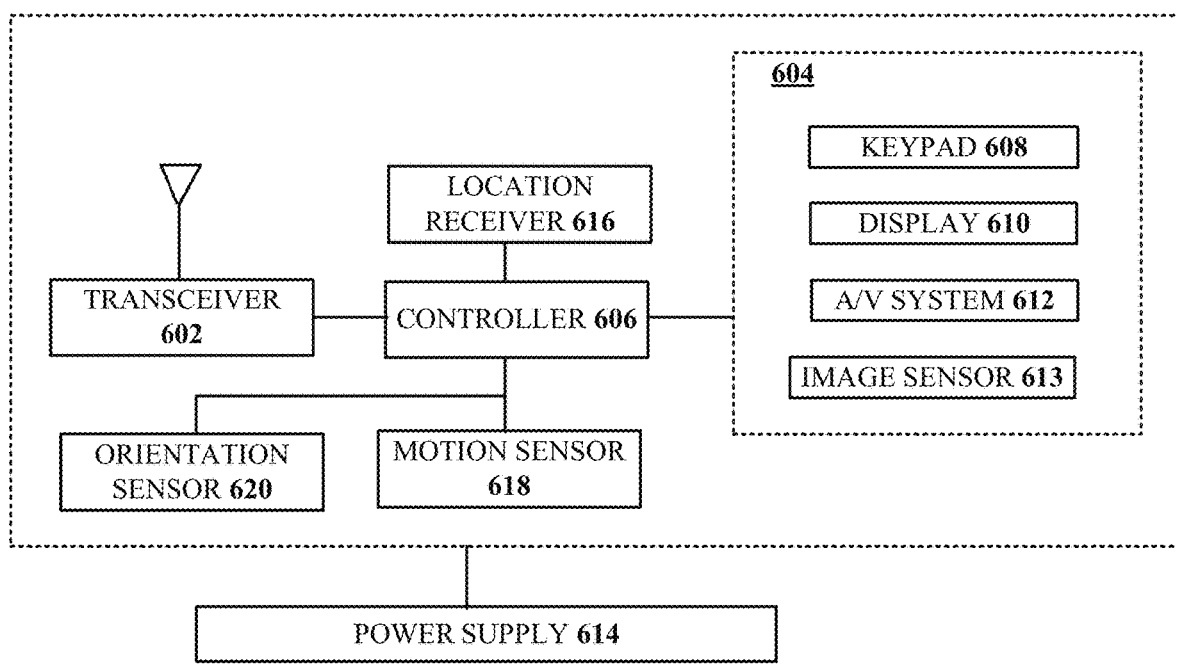
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part controlling access by a mobile device in a mobility network to particular network resources by communicating commands to the mobile device to update its capabilities information to select or deselect the particular network resources, such as a radio frequency band, and communicating the updated capabilities information to a base station of the mobility network.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, Zigbee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A non-transitory machine-readable medium, comprising executable instructions that, when executed by a processing system including a processor, facilitate performance of operations, the operations comprising:
   initiating a registration process by a device with a mobility network;
   retrieving, by the device, device capabilities information for the device;
   communicating to the mobility network the device capabilities information for the device;
   receiving, from the mobility network at the device, a resource communication, the resource communication defining excluded network resources, the resource communication being based on an analysis of network resources available to the device according to a subscription plan for the device;
   modifying the device capabilities information for the device to omit the excluded network resources from the device capabilities information, forming updated device capabilities information for the device;
   communicating the updated device capabilities information for the device to the mobility network;
   beginning communication between the device and the mobility network according to the updated device capabilities information for the device;

transmitting, to the mobility network, a request to modify the subscription plan for the device, wherein the request to modify the subscription plan includes a request to access the excluded network resources for a predetermined time duration;

receiving, from the mobility network at the device, an updated resource communication, the updated resource communication including instructions to modify the updated device capabilities information to include the excluded network resources;

modifying the updated device capabilities information according to the updated resource communication, resulting in modified updated device capabilities information; and communicating the modified updated device capabilities information to the mobility network for subsequent radio communication between the device and the mobility network.

2. The non-transitory machine-readable medium of claim 1, wherein the receiving the resource communication defining excluded network resources comprises receiving a communication defining one or more frequency bands excluded from the subscription plan for the device.

3. The non-transitory machine-readable medium of claim 2, wherein the receiving the resource communication defining one or more frequency bands excluded from the subscription plan for the device comprises receiving a communication defining one or more high-capacity frequency bands.

4. The non-transitory machine-readable medium of claim 3, wherein the communicating to the mobility network the device capabilities information for the device comprises communicating a list of capable frequency bands usable by the device for communication with the mobility network, the list of capable frequency bands including at least one of the one or more high-capacity frequency bands and wherein the communicating the updated device capabilities information for the device comprises communicating an updated list of capable frequency bands, the updated list of capable frequency bands excluding the one or more high-capacity frequency bands.

5. The non-transitory machine-readable medium of claim 1, wherein the communicating to the mobility network the device capabilities information for the device comprises communicating authentication information to a service authentication device to enable the service authentication device to identify network resources available to the device according to the subscription plan for the device.

6. The non-transitory machine-readable medium of claim 5, wherein the receiving the resource communication comprises receiving, from the service authentication device, a communication defining one or more network resources determined by the service authentication device to be excluded from the subscription plan for the device.

7. The non-transitory machine-readable medium of claim 6, wherein the receiving the resource communication comprises receiving a frequency assignment communication authorizing use of one or more frequency bands for communication between the device and the mobility network.

8. The non-transitory machine-readable medium of claim 1, wherein the communicating to the mobility network the device capabilities information for the device comprises communicating information to control radio communication between the device and one or more base stations of the mobility network.

9. A system, comprising:
a processing system including one or more processors; and
a memory that stores executable instructions that, when executed by the processing system, facilitate performance of operations, the operations comprising:
one or more base stations for radio communication with one or more mobile devices, a base station of the one or more base stations operative to receive device capabilities information from a mobile device of the one or more mobile devices, the base station further operative to initiate communication between the mobile device and the base station according to the device capabilities information, wherein the base station is operative to receive a subscription plan for the mobile device and a request to modify the subscription plan for the mobile device, and wherein the subscription plan includes an excluded network resource and the request to modify the subscription plan includes access to the excluded network resource for a predetermined time duration; and
a service authentication device in data communication with the mobile device to receive the device capabilities information, the service authentication device operative to authorize use of network resources according to device provisioning information for the mobile device, the service authentication device being operative to communicate, to the mobile device, an authorization communication, the authorization communication causing the mobile device to modify the device capabilities information forming updated device capabilities information and communicate the updated device capabilities information to the base station for subsequent communication between the mobile device and the base station according to the updated device capabilities information; and
wherein the service authentication device is further operable to:
authorize a modified use of network resources for the mobile device including the access to the excluded network resource according to the modified subscription plan; and
communicate an updated authorization communication, the updated authorization communication causing the mobile device to modify the device capabilities information to add the excluded network resources, resulting in modified device capabilities information, and causing the mobile device to communicate the modified device capabilities information to the base station for subsequent radio communication between the mobile device and the base station, following the predetermined time duration.

10. The system of claim 9, wherein the one or more base stations are operative to store the device capabilities information at the one or more base stations for use during the communication between the mobile device and the base station, and wherein the one or more base stations are further operative to store the updated device capabilities information for the subsequent communication between the mobile device and the base station.

11. The system of claim 9, wherein the service authentication device is operative to identify one or more excluded frequency bands excluded from the subscription plan of the mobile device and wherein the authorization communication causes the mobile device to delete information about the one or more excluded frequency bands from the device capabilities information.

12. The system of claim 11, wherein the base station is configured to receive the updated device capabilities information and to subsequently prohibit radio communication with the mobile device on the one or more excluded frequency bands.

13. The system of claim 9, wherein the service authentication device is operative to identify an authorized list of frequency bands defined for the mobile device by a subscription plan of the mobile device and wherein the service authentication device is operative to communicate a frequency band authorization communication including the authorized list of frequency bands the mobile device is authorized to use for communication with the base station.

14. A method, comprising:
  receiving, by a processing system including a processor, an authentication request from a mobile device operating on a mobility network including a base station;
  receiving, by the processing system, a subscription plan for the mobile device, wherein the subscription plan includes at least one forbidden resource; and
  identifying, by the processing system, authorized network resources for the mobile device according to the subscription plan;
  communicating, by the processing system, to the mobile device, a resource authorization message, the resource authorization message causing the mobile device to update a device capabilities profile of the mobile device according to the authorized network resources for the mobile device, the resource authorization message causing the mobile device to communicate an updated device capabilities profile to the base station for subsequent radio communication between the mobile device and the base station;
  receiving, by the processing system, a request to modify the subscription plan for the mobile device including access to the at least one forbidden resource for a predetermined time duration;
  modifying, by the processing system, the subscription plan for the mobile device for the predetermined time duration, wherein the modifying is according to the request to modify the subscription plan for the mobile device; and
  communicating a new resource allocation message, the new resource allocation message causing the mobile device to change the device capabilities profile of the mobile device to add the access to the at least one forbidden resource for the predetermined time duration, wherein the new resource allocation message further causes the mobile device to communicate a new device capabilities profile to the base station for subsequent radio communication between the mobile device and the base station.

15. The method of claim 14, wherein the subscription plan includes or omits features including Wi-Fi calling, video calling, voice over LTE, video over LTE, use of the mobile device as a hotspot to provide Wi-Fi calling to the mobility network for other nearby devices, or a combination thereof.

16. The method of claim 14, wherein the authorizing the authorized network resources comprises:
  identifying, by the processing system, one or more authorized frequency bands for use by the mobile device for subsequent radio communication between the mobile device and the base station.

17. The method of claim 14, wherein the subscription plan specifies features to which the mobile device has access including a radio access technology, and the subscription plan includes 5G access including no access to mm Wave frequency bands.

18. The method of claim 14, comprising:
  updating, by the processing system, a database to reflect the received subscription plan, wherein the database is stored with information that the received subscription plan includes a list of forbidden frequency bands in the subscription plan; and
  transmitting, by the processing system, an authentication response to the mobile device, wherein the authentication response includes the list of forbidden frequency bands.

19. The method of claim 14, comprising:
  receiving, by the processing system, provisioning information for the mobile device, the provisioning information defining the authorized network resources for the mobile device.

20. The method of claim 19, wherein the receiving provisioning information for the mobile device comprises:
  receiving, by the processing system, information defining a service level tier for a user account associated with the mobile device;
  storing, by the processing system, in a database, the information defining a service level tier for a user account; and
  identifying, by the processing system, the authorized network resources for the mobile device based on the information defining a service level tier for a user account.

* * * * *